(12) United States Patent
Fujisaki et al.

(10) Patent No.: US 9,280,674 B2
(45) Date of Patent: Mar. 8, 2016

(54) INFORMATION PROCESSING APPARATUS AND METHOD OF CONTROLLING SAME

(71) Applicant: FUJITSU LIMITED, Kawasaki-shi, Kanagawa (JP)

(72) Inventors: Naoya Fujisaki, Yokohama (JP); Kazuaki Nimura, Kawasaki (JP)

(73) Assignee: FUJISU LIMITED, Kawasaki (JP)

( * ) Notice: Subject to any disclaimer, the term of this patent is extended or adjusted under 35 U.S.C. 154(b) by 78 days.

(21) Appl. No.: 14/065,534

(22) Filed: Oct. 29, 2013

(65) Prior Publication Data

US 2014/0157436 A1 Jun. 5, 2014

(30) Foreign Application Priority Data

Dec. 4, 2012 (JP) .................................. 2012-265445

(51) Int. Cl.
G06F 21/62 (2013.01)
G06F 21/60 (2013.01)
G06F 21/50 (2013.01)

(52) U.S. Cl.
CPC ................ *G06F 21/62* (2013.01); *G06F 21/60* (2013.01); *G06F 21/50* (2013.01); *G06F 21/604* (2013.01); *G06F 21/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,765,603 | B2 * | 7/2010 | Tanaka ..................... | G06F 21/10 380/201 |
| 7,962,950 | B2 * | 6/2011 | Choo et al. ......................... | 726/2 |
| 8,312,075 | B1 * | 11/2012 | Makinson et al. ............ | 709/203 |
| 8,473,702 | B2 * | 6/2013 | Inoue et al. .................... | 711/165 |
| 8,875,164 | B2 * | 10/2014 | Fujisaki et al. ................ | 719/330 |
| 2002/0090208 | A1 * | 7/2002 | Hatanaka ....................... | 386/117 |
| 2003/0197512 | A1 * | 10/2003 | Miller et al. .................. | 324/426 |
| 2004/0088677 | A1 * | 5/2004 | Williams ....................... | 717/104 |
| 2005/0091536 | A1 * | 4/2005 | Whitmer et al. .............. | 713/201 |
| 2007/0174915 | A1 * | 7/2007 | Gribble et al. .................. | 726/24 |
| 2008/0243854 | A1 * | 10/2008 | Noguchi ............ | G06F 21/6218 |
| 2008/0289031 | A1 * | 11/2008 | Anno .............................. | 726/17 |
| 2009/0249435 | A1 * | 10/2009 | Madathilparambil George ................... | G06F 21/57 726/1 |
| 2009/0307781 | A1 | 12/2009 | Iga et al. | |

(Continued)

FOREIGN PATENT DOCUMENTS

| | | |
|---|---|---|
| JP | 2006-65493 | 3/2006 |
| WO | 2007/074565 | 7/2007 |

OTHER PUBLICATIONS

Ito et al, "Application Push & Play—Proposal on Dynamic Execution Environment Combined with Personal Devices and Cloud Computing", Internaional Journal of Information Society, vol. 4, No. 3, ISSN1883-4566, 2012.*

*Primary Examiner* — Peter Poltorak
(74) *Attorney, Agent, or Firm* — Staas & Halsey LLP

(57) ABSTRACT

An information processing apparatus includes a memory and a processor coupled to the memory and configured to receive an instruction to transfer a first application to an execution environment, detect a second application that shares a resource with the first application, the resource being information used upon executing the first application and the second application, provide information for causing a user to determine whether to prohibit transferring the second application to the execution environment when the second application is detected, and invalidate a state in which the second application shares the resource with the first application when instruction to prohibit transferring the second application to the execution environment is received.

15 Claims, 22 Drawing Sheets

(56) References Cited

U.S. PATENT DOCUMENTS

| | | | |
|---|---|---|---|
| 2010/0005291 A1* | 1/2010 | Hulten et al. | 713/156 |
| 2010/0306528 A1* | 12/2010 | Andress et al. | 713/153 |
| 2011/0270963 A1* | 11/2011 | Saito | G06F 21/105 709/224 |
| 2013/0074160 A1* | 3/2013 | Nakamura et al. | 726/4 |
| 2013/0185816 A1* | 7/2013 | Maeda | G06F 21/604 726/30 |
| 2013/0282752 A1* | 10/2013 | Day-Richter | G06F 21/62 707/769 |
| 2014/0041051 A1* | 2/2014 | Meketa et al. | 726/28 |
| 2014/0075502 A1* | 3/2014 | Aissi et al. | 726/1 |
| 2014/0250501 A1* | 9/2014 | Berard | G06F 21/62 726/4 |

* cited by examiner

FIG. 8A

```
<permission>
  <item name>
</permission>

<package codePath nativeLibraryPath>
  <perms>
    <item name>
  </perms>
</package>
```

FIG. 8B

```
<package>
  <perms>
    <item name="andoroid.permission.EXPAND_STATUS_BAR"/>
    <item name="andoroid.permission.CALL_PHONE"/>
  </perms>
</package>
```

FIG. 9A

| ITEM NUMBER | PACKAGE NAME | USER ID | GROUP ID | CONTAINMENT FOLDER NAME |
|---|---|---|---|---|
| 1 | com.open.drive.application | uid-1 | grp-A | /data/data/com.open.drive.application |
| 2 | com.open.dictionary | uid-2 | grp-B | /data/data/com.open.dictionary |
| 3 | com.open.inputmethodja | uid-3 | grp-A | /data/data/com.open.inputmethodja |
| ... | ... | ... | ... | ... |

| ITEM NUMBER | PACKAGE NAME | USER ID | GROUP ID | CONTAINMENT FOLDER NAME |
|---|---|---|---|---|
| 1 | com.open.drive.application | uid-1 | uid-1 | /data/data/com.open.drive.application |
| 2 | com.open.dictionary | uid-2 | uid-2 | /data/data/com.open.dictionary |
| 3 | com.open.inputmethodja | uid-1 | uid-1 | /data/data/com.open.inputmethodja |
| ... | ... | ... | ... | ... |

| PACKAGE NAME | USER ID [/GROUP ID] | CONTAINMENT FOLDER NAME |
|---|---|---|
| com.open.drive.application | uid-1 | /data/data/ja.co.acompany.documentation.com.open.drive.application/ |
| com.open.dictionary | uid-2 | /data/data/com.open.dictionary |
| com.open.inputmethodja | uid-1 | /data/data/ja.co.acompany.documentation.com.open.inputmethodja |
| ... | ... | ... |

FIG. 12

| DOMAIN ID | PACKAGE NAMES | REWRITING STRING | CURRENT INFORMATION (USER ID [/GROUP ID]) | ORIGINAL INFORMATION (USER ID [/GROUP ID]) |
|---|---|---|---|---|
| dom1 | com.open.drive.application | jp.co.acompany.documentation. | uid-1 | uid-1 |
| | com.open.inputmethodja | jp.co.acompany.documentation. | uid-1 | uid-1 |
| | ... | ... | ... | ... |

| PACKAGE NAME | USER ID [/GROUP ID] | CONTAINMENT FOLDER NAME |
|---|---|---|
| com.open.drive.application | uid-100 | /data/data/ja.co.acompany.documentation.com.open.drive.application/ |
| com.open.dictionary | uid-2 | /data/data/com.open.dictionary/ |
| com.open.inputmethodja | uid-1 | /data/data/com.open.inputmethodja/ |
| ... | ... | ... |

FIG. 14

| DOMAIN ID | PACKAGE NAMES | REWRITING STRING | CURRENT INFORMATION (USER ID [/GROUP ID]) | ORIGINAL INFORMATION (USER ID [/GROUP ID]) |
|---|---|---|---|---|
| dom1 | com.open.drive.application | jp.co.acompany.documentation | uid-100 | uid-1 |
| ... | ... | ... | ... | ... |

```
<item name="isolate.domain.name.com.flab.hcpf.launcher.permission.INSTALL_SHORTCUT"
package="com.flab.hcpf.launcher" protection="y" />
<item name="isolate.domain.name.com.flab.hcpf.launcher.permission.UNINSTALL_SHORTCUT"
package="com.flab.hcpf.launcher" protection="2" />
......
<package name="com.flab.hcpf.launcher" codePath="/data/app/isolate.domain.name.com.flab.hcpf.launcher-1.apk"
nativeLibraryPath="/data/dat/isolate.domain.name.com.flab.hcpf.launcher/lib" flags="1" ft="12dedbac18"
it="12dedbac18" ut="12dedbac18" version="10" userId="10034">
<sigs count="1">
<cert index="2" key="308204a830820390a0......1eaafc2a556f84" />
</sigs>
<perms>
<item name="android.permission.EXPAND_STATUS_BAR" />
<item name="isolate.domain.name.android.permission.WRITE_SETTINGS" />
<item name="isolate.domain.name.android.permission.READ_CONTACTS" />
<item name="android.permission.CALL_PHONE" />
<item name="isolate.domain.name.com.flab.hcpf.launcher.permission.WRITE_SETTINGS" />
<item name="isolate.domain.name.com.flab.hcpf.launcher.permission.READ_SETTINGS" />
</perms>
</package>
```

( BOLD PORTION REPRESENT PART SUBJECT TO REWRITING,
ITALIC PORTION ALTERED PART, AND UNDERLINED
PORTION EACH PART OF INVALIDATED PERMISSION )

| ITEM NUMBER | REFERENCE TARGET URL | DOMAIN ID LIST |
|---|---|---|
| 1 | //site.acompany.co.jp/documentation/openapps/index.html | dom1 |
| 2 | //site.androidapps.com/recommendation/index.html | dom1,dom2 |
| ... | ... | ... |

| DOMAIN ID | TITLE | PACKAGE NAME |
|---|---|---|
| dom1 | DOCUMENT | com.software.drive.application |
| | JAPANESE INPUT | com.software.inputmethodja |
| ... | ... | ... |

| DOMAIN ID | TITLE | PACKAGE NAME |
|---|---|---|
| dom1 | JAPANESE INPUT | com.malware.keylogger |
| ... | ... | ... |

INFORMATION PROCESSING APPARATUS AND METHOD OF CONTROLLING SAME

CROSS-REFERENCE TO RELATED APPLICATION

This application is based upon and claims the benefit of priority of the prior Japanese Patent Application No. 2012-265445, filed on Dec. 4, 2012, the entire contents of which are incorporated herein by reference.

FIELD

The embodiments discussed herein are related to an information processing apparatus and a method of controlling same.

BACKGROUND

A sandbox is a known technique for secure execution of a program by an information processing device, in particular a portable information processing device. A sandbox is a technique in which, after resources to be used by a program are confined in a protected environment, the program is executed in the protected environment, thereby avoiding harmful influences outside the protected environment. For example, FIG. 1 illustrates a state in which an application A to which a user ID="0123" has been assigned and an application B to which a user ID="4567" has been assigned are executed in different sandboxes from each other, thereby preventing access to resources of each other.

However, when a file name is modified by a malicious program, the program that has to be executed in a sandbox does not match a file name found in a list that is stored in a user or a system, and thus the program turns out not to be executed in the sandbox. Therefore, a first technique for more certain execution in a sandbox, of a program set to be executed in the sandbox is proposed. The first technique secures a special storage region to store a program intended to be executed securely and determines whether the program to be executed is stored in the special storage region, and when the program to be executed is stored in the special storage region, executes the program in an environment where available resources are limited.

In addition, regarding control over execution of an application program, a second technique for protecting system resources, particularly from an application program that contains unreliable code, for secure execution is proposed. The second technique creates an execution environment in which access to outside the execution environment is limited and arranges at least a part of each of the device driver, the library, and user data provided in the computer to allow read access from a program that runs in the execution environment. Then, the second technique executes an application program that is introduced or obtained from an application distribution server or the like in the execution environment.

Examples of related art are Japanese Laid-open Patent Publication No. 2006-65493 and International Publication Pamphlet No. WO 2007/074565.

SUMMARY

According to an aspect of the invention, an information processing apparatus includes a memory and a processor coupled to the memory and configured to receive an instruction to transfer a first application to an execution environment, detect a second application that shares a resource with the first application, the resource being information used upon executing the first application and the second application, provide information for causing a user to determine whether to prohibit transferring the second application to the execution environment when the second application is detected, and invalidate a state in which the second application shares the resource with the first application when instruction to prohibit transferring the second application to the execution environment is received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B are lists indicating an example of conversion policy information;

FIGS. 9A and 9B are tables illustrating an example of package management information;

FIG. 11 is a table illustrating an example of package management information;

FIG. 12 is a table illustrating an example of entry management information;

FIG. 13 is a table illustrating an example of package management information;

FIG. 14 is a table illustrating an example of entry management information;

FIG. 15 is a list indicating an example of permission management information before alteration;

FIG. 16 is a list indicating an example of permission management information after alteration;

FIGS. 22A and 22B are tables illustrating an example of transfer permission list information.

DESCRIPTION OF EMBODIMENTS

In recent years, smart terminals, portable information processing devices in which a mobile phone is equipped with the functionality of a personal computer (PC) or portable digital assistant (PDA), have become rapidly widespread. Since such a smart terminal has a built-in computer, it is possible to carry out various types of data processing, along with making voice calls, such as sending and receiving emails and browsing web pages.

In view of the spread of smart terminals, enterprises are progressive in introducing "bring your own device (BYOD)", which by enabling access to an in-house IT system from outside the company for each employee's personal smart terminal, contributes to the performance of work by each employee. In the background of the introduction of BYOD, it has been raised that employees are easily able to make full use of a smart terminal that they are regularly familiar with, compared with a smart terminal for business use furnished by the company and that improvement in operational efficiency is foreseen by promoting centralization of information. In addition, it is also possible for the enterprises to expect cost reduction by not having to distribute and manage smart terminals for business use.

However, because BYOD uses smart terminals that belong personally to individual employees for business use, there remain concerns over security, such as leakage of confidential information to an external party and infection with a virus. Regarding such concerns, consideration can be given to constructing a sandbox or similar specific environment for business use to distribute business information in the specific environment for business use, and also to transfer (import) an application for business use to the specific environment for execution, thereby avoiding leakage of business information.

However, even when a specific environment for business use as above is constructed, a situation in which an application not for business use has to be transferred to the specific environment for business use is considered. An application not for business use to be transferred to the specific environment for business use may include, for example, applications for a social networking service (SNS), applications for a voice call, applications for front-end processing, and the like. Therefore, taking the convenience of users into account, even when constructing a specific environment for business use as well, there is a need to enable an arbitrary application to be transferred to the specific environment.

Figure 1:
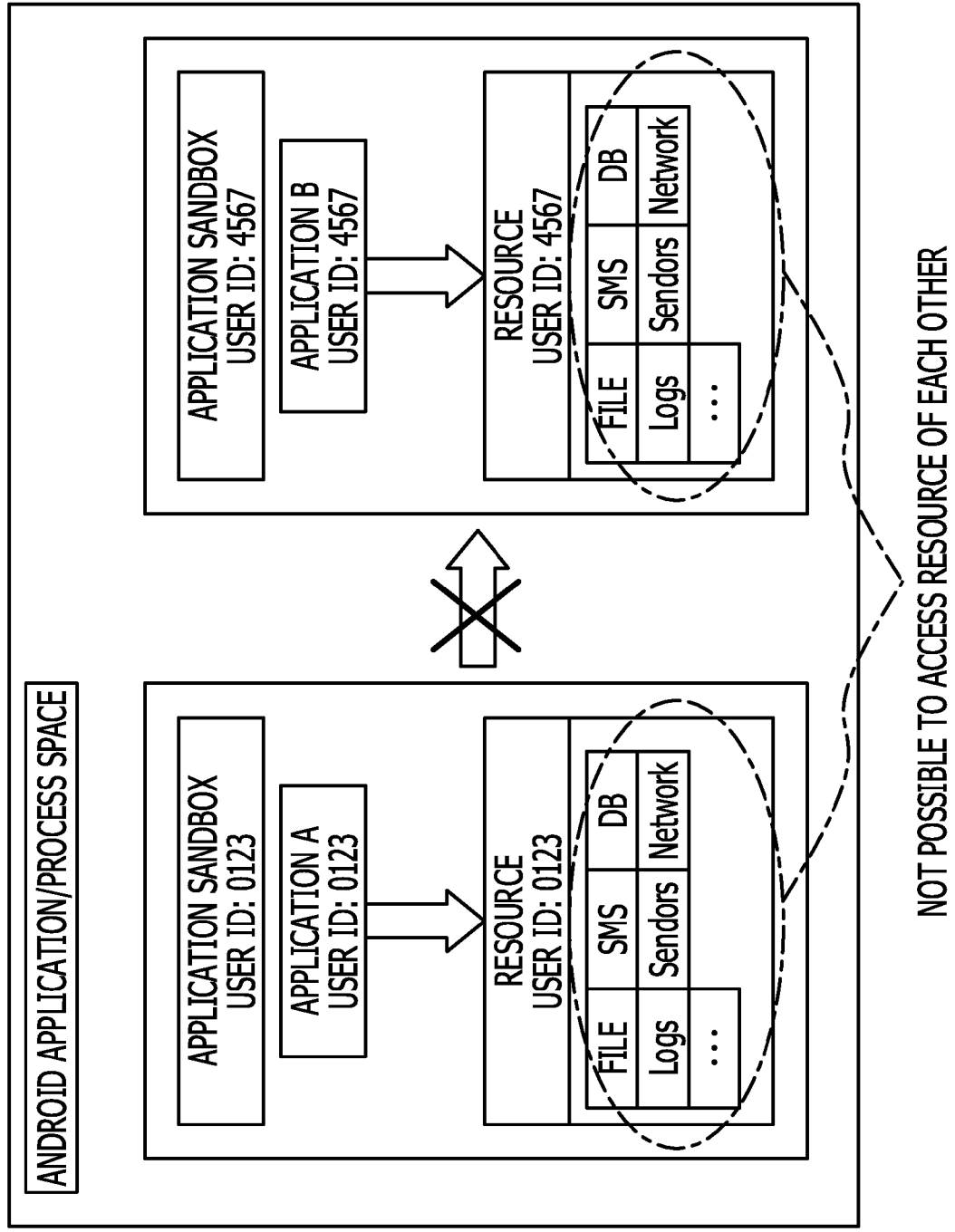
FIG. 1 is a conceptual diagram illustrating a state in which applications A and B, to which different user IDs have been assigned, are each executed in sandboxes different from the other.
Figure 2:
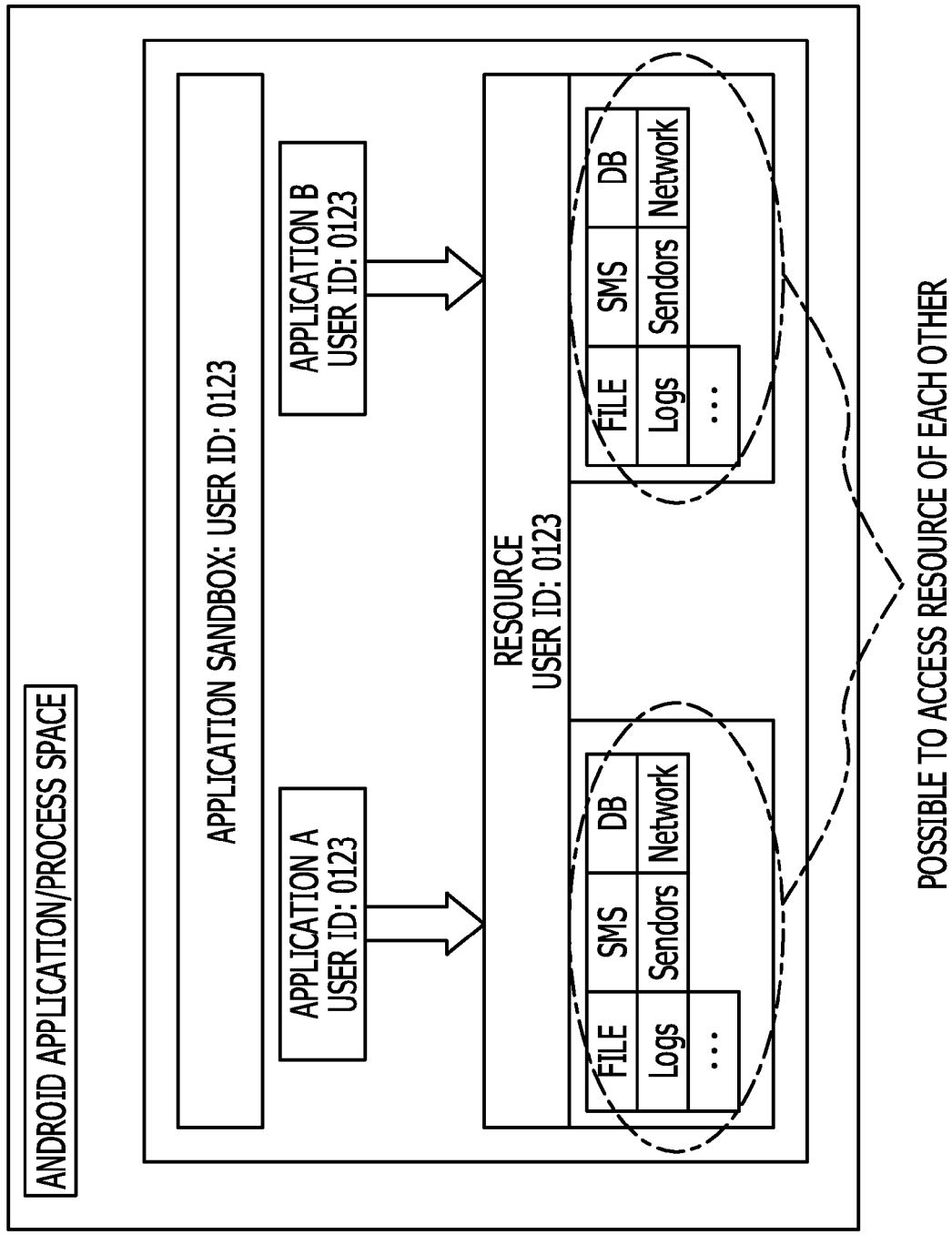
FIG. 2 is a conceptual diagram illustrating a state in which applications A and B assigned the same user ID are executed in the same sandbox.

In contrast, a developer of an application may set a plurality of developed applications to be allowed to share resources of each other. For example, FIG. 2 illustrates a state in which an identical user ID="0123" is assigned to an application A and an application B, thereby enabling each access to the resources of the other.

Figure 3:
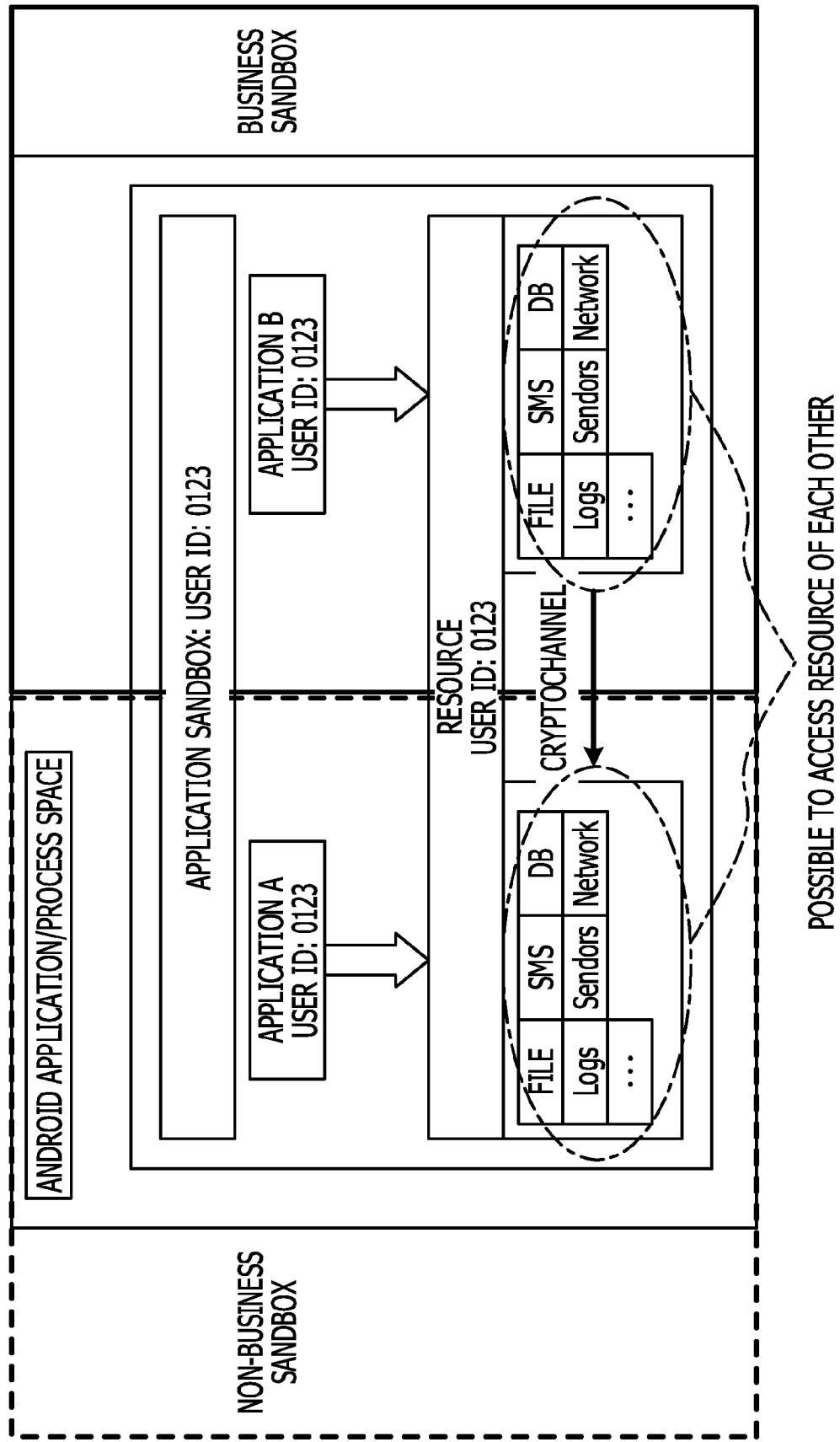
FIG. 3 is a conceptual diagram illustrating a state in which, among applications A and B assigned the same user ID, only the application B is executed in a sandbox for business use, thereby forming a cryptochannel.

Then, once some of the plurality of applications that are set to be enabled to share resources are transferred to a specific environment for business use, there is an issue in which a cryptochannel that allows leakage of resources in the specific environment to outside the specific environment may be formed. For example, FIG. 3 illustrates a state in which, among applications A and B assigned an identical user ID="0123", only the application B is transferred to a sandbox for business use, thereby forming a cryptochannel that enables each access to the resources of the other. Even when such a cryptochannel is formed, a user is not able to know that the cryptochannel has been formed and is also not able to take countermeasures.

Detailed descriptions are given below to an example of embodiments of the disclosed technique with reference to the drawings.

First Embodiment

Figure 4:
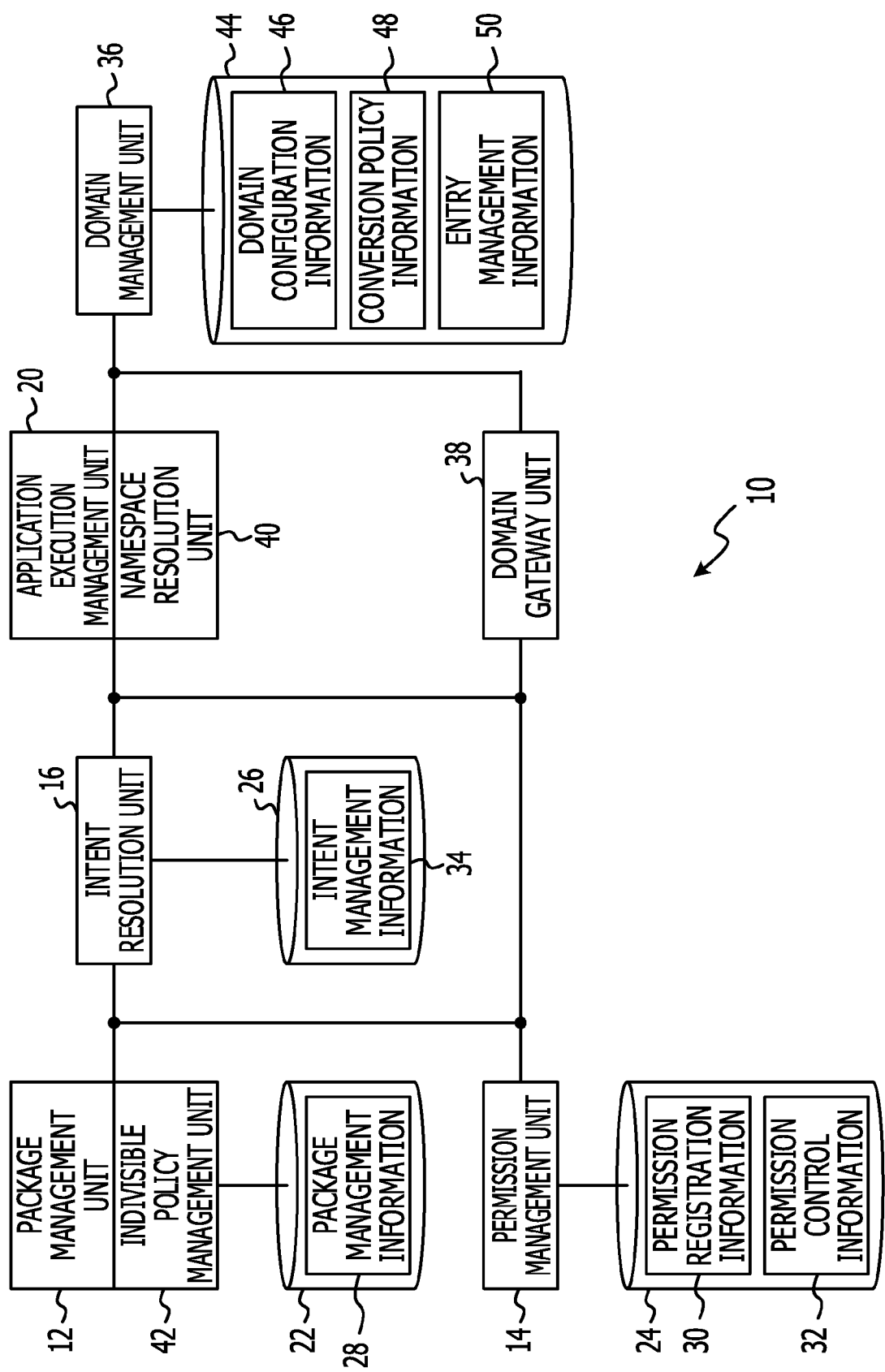
FIG. 4 is a functional block diagram of an information processing device according to a first embodiment.

With reference to the drawings, detailed descriptions are given below to an example of embodiments of the disclosed technique. FIG. 4 illustrates an information processing terminal 10 according to the first embodiment. Although the information processing terminal 10 is preferably a smart terminal, which is a portable information processing device of a mobile phone equipped with the functionality of a PC or a PDA, the terminal 10 may also be a PC, a PDA, a tablet terminal, or the like.

The information processing terminal 10 includes, as a functional block to function as a platform, a package management unit 12, a permission management unit 14, an intent resolution unit 16, an application execution management unit 20, a first storage unit 22, a second memory storage unit 24, and a third storage unit 26.

The package management unit 12 performs a process to register information, for an application package that is downloaded from elsewhere and stored to the information processing terminal 10 in package management information 28 that is stored in the first storage unit 22. The permission management unit 14 manages information related to permission/prohibition for the use of resources to be used by an application stored in the information processing terminal 10 by using permission registration information 30 and permission control information 32 that are stored in the second storage unit 24.

The intent resolution unit 16 performs, when an application stored in the information processing terminal 10 is called by an intent, an intent resolution process to recognize the called application based on intent management information 34 stored in the third storage unit 26. The application execution management unit 20 performs a process to manage execution of an application that is activated by a call by an intent or the like.

In addition, the information processing terminal 10 is further provided with a domain management unit 36, a domain gateway unit 38, a namespace resolution unit 40, an indivisible policy management unit 42, and a fourth storage unit 44.

The domain management unit 36 constructs a specific execution environment, similar to a sandbox, (hereinafter, referred to as a domain) for an application. The domain management unit 36, when constructing the domain, updates and manages domain configuration information 46, entry management information 50, and conversion policy information 48 that are stored in the fourth storage unit 44. The domain configuration information 46 has the name of a domain and the like set therein, and the entry management information 50 has information set within of an application that has been entered in (transferred to) a domain. The conversion policy information 48 has, when a certain application is entered in (transferred to) a domain, information for converting label information, such as permission declared by the application, set therein for each domain. Although a mode in which the domain management unit 36 constructs an execution environment of a business profile as a domain will be described in the present embodiment, the domain management unit 36 may construct one or more domains.

The domain gateway unit 38 performs a process to cause an application specified by a user to enter (transfer to) a domain specified by the user. The domain gateway unit 38, when transferring the application to the domain, rewrites information of the application in accordance with the conversion policy information 48 that is stored in the fourth storage unit 44 and adds information about the application to the entry management information 50 for the domain to be transferred to.

In addition, the domain gateway unit 38, after an application subject to the entry is specified by a user, receives a list of applications to be entered from the indivisible policy management unit 42 and asks the user's permission whether to enter all applications in the list. A list of applications assigned the same user ID as the user ID of the application is generated. Then, the domain gateway unit 38 enters each application permitted by the user out of the applications in the list into the specified domain.

The indivisible policy management unit 42 performs a process to prevent information leaking from inside the domain to outside the domain, which is caused by the sharing of the resources by applications having the same user ID (or group ID) allocated thereto. That is, the indivisible policy management unit 42 is called when the domain gateway unit 38 causes the specified application to enter the specified domain. The indivisible policy management unit 42 detects from the package management information 28 application packages having a user ID identical to the user ID assigned to the package of the specified application and creates a list that displays a listing of the detected application packages.

In addition, the indivisible policy management unit 42 sends the created list to the domain gateway unit 38. Then, the indivisible policy management unit 42, upon receiving a command from the domain gateway unit 38 to alter the user ID assigned to a specific application to another unique user ID, rewrites the user ID of the application.

The namespace resolution unit 40 performs execution monitoring and access control for an application. That is, the namespace resolution unit 40 identifies both activation of an application by an intent as well as access to information. The namespace resolution unit 40 identifies which domain the calling application has been entered into and identifies which domain the application being called has been entered into. Then, the namespace resolution unit 40 issues a command to the application execution management unit 20 as to whether to permit or prohibit the activation of the application being called. In addition, the namespace resolution unit 40 identifies, for information about an access destination by the application being called, in which domain the information is contained in and issues a command to the permission management unit 14 in the system as to whether to permit or prohibit access to the information.

It is to be noted that the domain management unit 36 is an example of an environment constructor in the disclosed technique and the indivisible policy management unit 42 is an example of a transfer manager in the disclosed technique. In addition, the domain gateway unit 38 is an example of a transferer in the disclosed technique and the namespace resolution unit 40 is an example of a controller in the disclosed technique.

Figure 5:
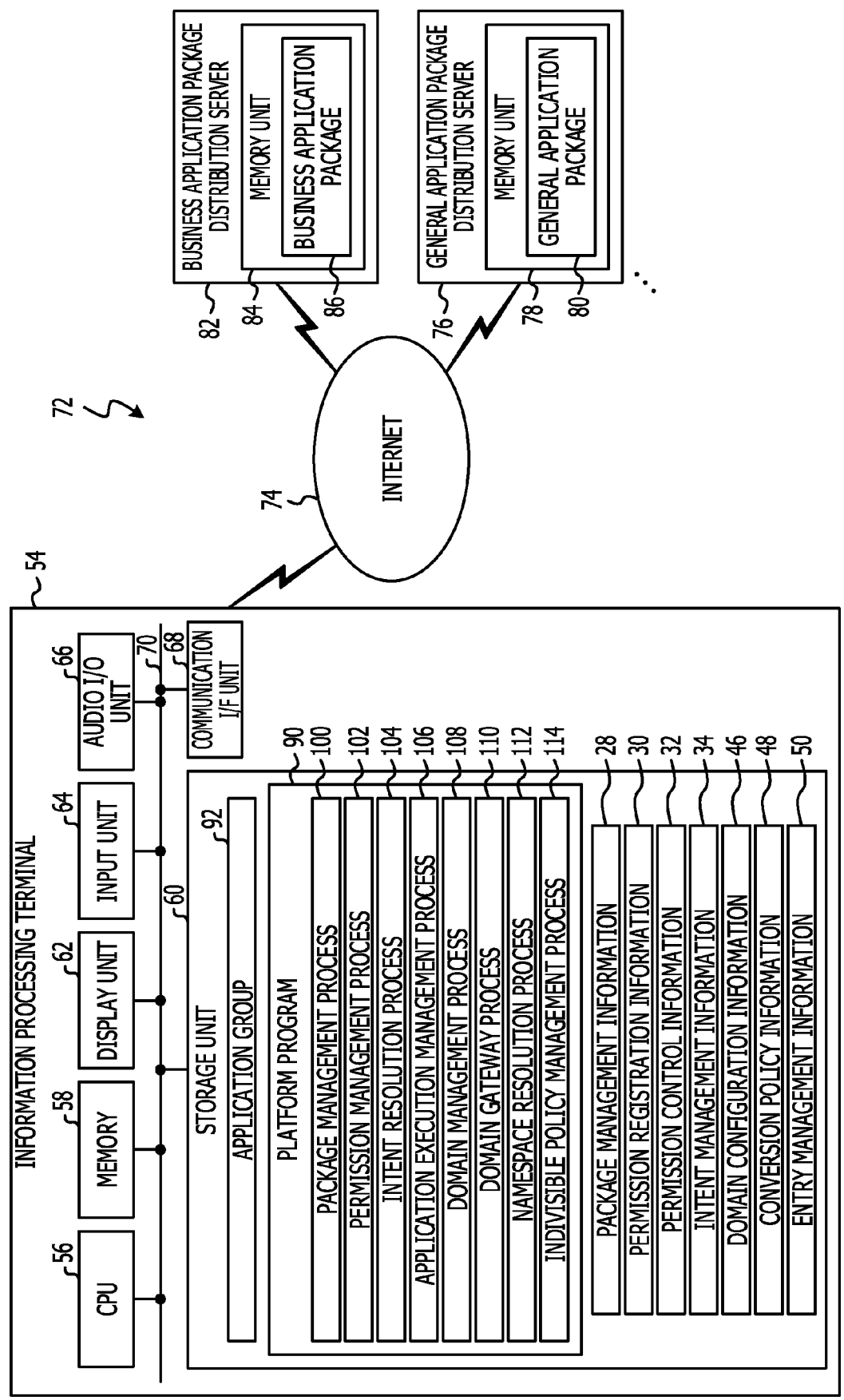
FIG. 5 is a block diagram of a computer that may function as the information processing device in FIG. 1 and the periphery thereof.

The information processing terminal 10 may be achieved by, for example, a computer 54 illustrated in FIG. 5. The computer 54 is provided with a CPU 56, a memory 58, a nonvolatile storage unit 60, a display unit 62, an input unit 64, an audio input/output (I/O) unit 66, and a network interface (I/F) unit 68. The CPU 56, the memory 58, the storage unit 60, the display unit 62, the input unit 64, the audio input/output unit 66, and the network I/F unit 68 are connected to each other via a bus 70.

The computer 54 is included in a computer system 72 and is connected to the internet 74 via a network I/F unit 58. The computer system 72 is provided with a plurality of general application package distribution servers 76 and a business application package distribution server 82. Each of the general application package distribution servers 76 and the business application package distribution server 82 are connected to the internet 74.

The general application package distribution server 76 is provided with a storage unit 78, and in the storage unit 78, a general application package 80 is stored in a form that is able to be downloaded by the information processing terminal 10. The business application package distribution server 82 is provided with a storage unit 84, and in the storage unit 84, a business application package 86 is stored in a form that is able to be downloaded by the information processing terminal 10. It is to be noted that the business in the present embodiment represents the work at the enterprise that the user having the information processing terminal 10 is employed at, and the business application package includes an application program group that has to be used to accomplish the work.

In contrast, the storage unit 60 in the computer 54 may be achieved by a hard disk drive (HDD), a flash memory, or the like. In the storage unit 60, which is a recording medium, a platform program 90 and an application group 92 for enabling the computer 54 to function as the information processing terminal 10 are stored. In addition, in the storage unit 60, the domain configuration information 46, the conversion policy information 48, the entry management information 50, the intent management information 34, the package management information 28, the permission registration information 30, and the permission control information 32 are stored. As just described, the storage unit 60 functions as an example of each of the first storage unit 22 through the third storage unit 26 and the fourth storage unit 44. The CPU 56 reads out the platform program 90 from the storage unit 60 for expansion into the memory 58 and sequentially executes processes contained in the platform program 90.

The platform program 90 has a package management process 100, a permission management process 102, an intent resolution process 104, an application execution management process 106, a domain management process 108, and a domain gateway process 110. In addition, the platform program 90 has a namespace resolution process 112 and an indivisible policy management process 114.

The CPU 56 executes the package management process 100, thereby behaving as the package management unit 12 illustrated in FIG. 4. The CPU 56 also executes the permission management process 102, thereby behaving as the permission management unit 14 illustrated in FIG. 4. The CPU 56 also executes the intent resolution process 104, thereby behaving as the intent resolution unit 16 illustrated in FIG. 4. The CPU 56 also executes the application execution management process 106, thereby behaving as the application execution management unit 20 illustrated in FIG. 4. The CPU 56 also executes the domain management process 108, thereby behaving as the domain management unit 36 illustrated in FIG. 4. The CPU 56 also executes the domain gateway process 110, thereby behaving as the domain gateway unit 38 illustrated in FIG. 4. The CPU 56 also executes the namespace resolution process 112, thereby behaving as the namespace resolution unit 40 illustrated in FIG. 4. The CPU 56 also executes the indivisible policy management process 114, thereby behaving as the indivisible policy management unit 42 illustrated in FIG. 4.

Accordingly, the computer 54 that has executed the platform program 90 turns out to function as the information processing terminal 10. It is to be noted that the platform program 90 is an example of an information processing program according to the disclosed technique of the present application.

It is also to be noted that the information processing terminal 10 may also be achieved by, for example, a semiconductor integrated circuit, more specifically an application specific integrated circuit (ASIC), or the like.

Next, an action of the present first embodiment is described. In the computer system 72 according to the present first embodiment, a general application package distribution site is constructed by means of the general application package distribution servers 76 that are on the internet 74. A user of the information processing terminal 10 is able to, using the information processing terminal 10, access the general application package distribution site on the internet 74 to search for an intended application and to obtain an evaluation of the intended application.

In such a situation, the package management unit 12 of the information processing terminal 10 downloads the general application package specified by the user from the distribution site and performs installation thereof. The user specifies the downloaded application, and while the application is being executed, the application execution management unit 20 manages the application.

In addition, in the computer system 72, a business application package distribution site is also constructed by means of the business application package distribution server 82 that is on the internet 74. The business application package distribution site is a site constructed by the enterprise that the user having the information processing terminal 10 works for, and distributes the business application package in order to make the business system available to employees.

The domain management unit 36 of the information processing terminal 10 provides another execution environment, isolated from the execution environment for a general application package, for the business application package downloaded from the business application package distribution site. Further, the isolated execution environment (hereinafter, referred to as a business domain) constructed by the domain management unit 36 is linked to the business application package distribution site. This link is made by a user of the information processing terminal 10 inputting credential information for an employee who uses the business system. In such a manner, a business application is executed in a business domain that is isolated from an execution environment for a general application (hereinafter, referred to as a general domain).

The namespace resolution unit 40 provides a solution for a namespace that manages both applications that cooperate across each execution environment as well as accessed information while the application execution management unit 20 monitors execution of applications and access to information. The namespace resolution unit 40 gives permission to or prohibits applications that cooperate across each execution environment as well as access to information.

The domain gateway unit 38 is positioned so as to join the general application package distribution site with the business application package distribution site. The domain gateway unit 38 moves the program and the resources of the application (hereinafter, referred to as an application package) between the general domain and the business domain.

The indivisible policy management unit 42 is called when the domain gateway unit 38 moves the application between the general domain and the business domain and displays the indivisible policy regarding the move to the user. The indivisible policy management unit 42, when moving the application specified by a user from a move source domain to a move destination domain, searches the package management information 28 and determines for all applications that are entered in the move source domain whether resources are shared with the application being moved. Then, the indivisible policy management unit 42 generates a list of applications that share resources with the application. For example, the list is used when asking permission from a user whether to enter all applications in the list into the domain.

Figure 6:
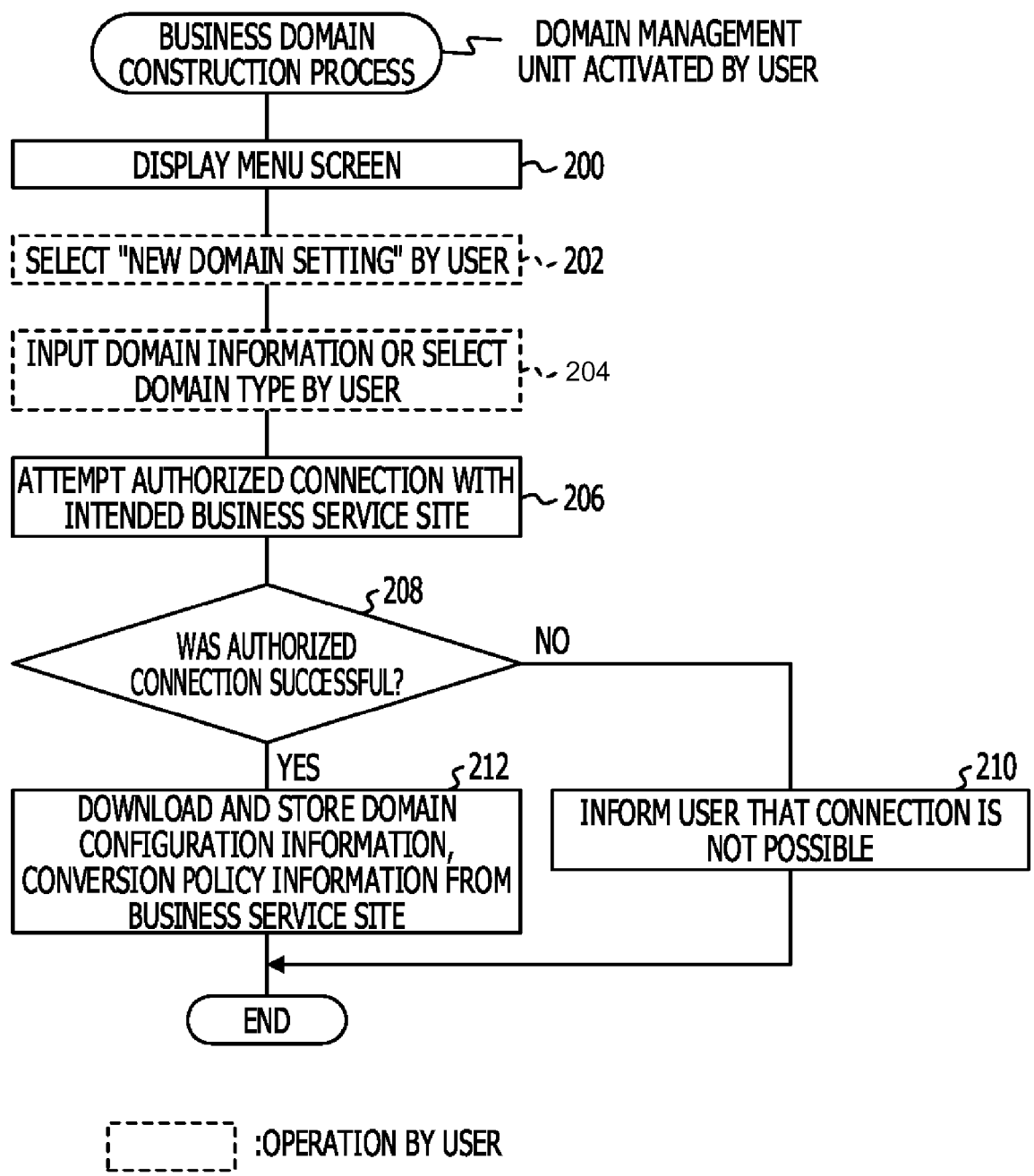
FIG. 6 is a flowchart illustrating an example of a business domain construction process.

Next, with reference to FIG. 6, a process when constructing a business domain is described. The business domain construction process illustrated in FIG. 6 is activated when a user of the information processing terminal 10 activates the domain management unit 36. In step 200 of the business domain construction setting process, the domain management unit 36 displays a menu screen on the display unit 62 of the information processing terminal 10. A plurality of items including "new domain setting" are displayed as options on the menu screen displayed by the domain management unit 36. When constructing a business domain the user selects the item "new domain setting" from the menu screen displayed on the display unit 62 of the information processing terminal 10 (also refer to step 202 in FIG. 6).

Figure 7:
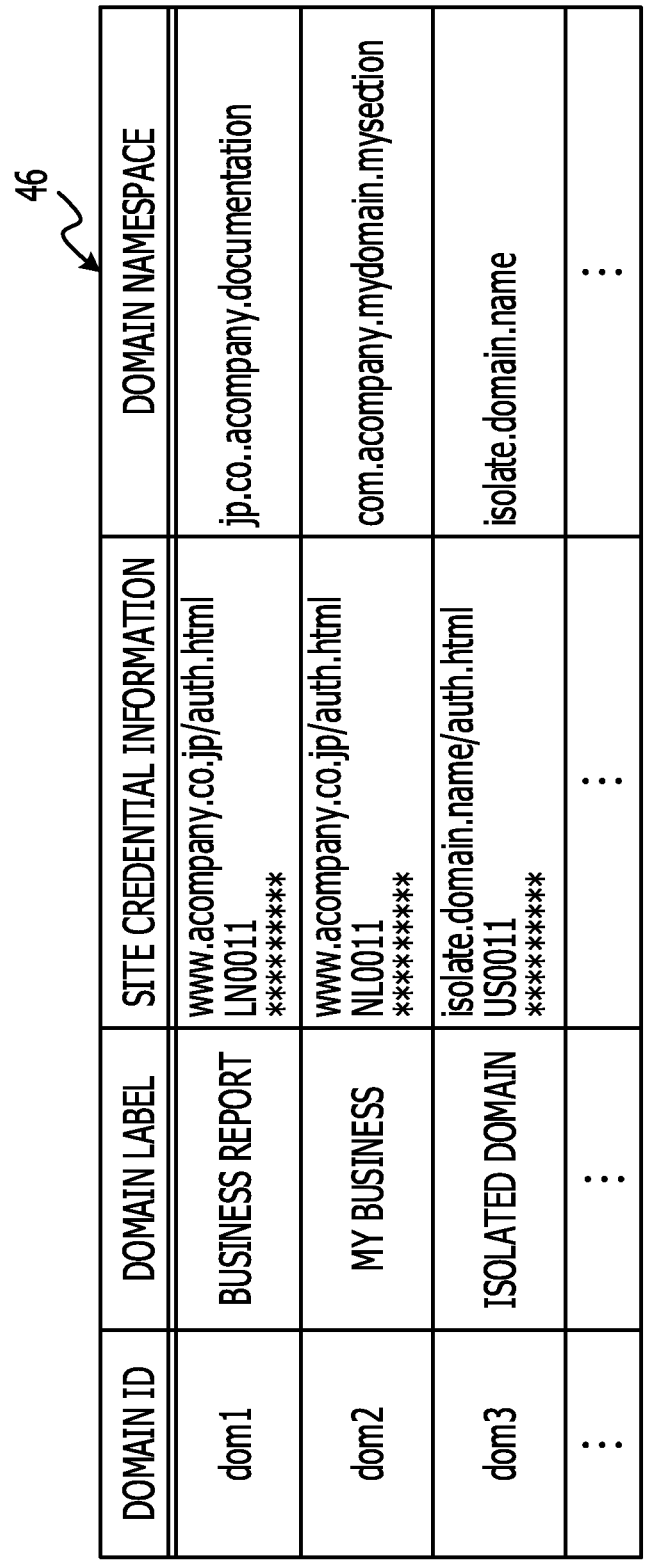
FIG. 7 is a table illustrating an example of domain configuration information.

Upon "new domain setting" being selected by the user, the domain management unit 36 displays a screen to input or select information related to the business domain to be constructed, thereby letting the user input or select the information related to the business domain (also refer to step 204 in FIG. 6). As illustrated in FIG. 7 as an example, information related to a business domain (domain configuration information 46) includes each piece of information about a domain ID, a domain label, site credential information, and a domain namespace. These pieces of information may be input by the user or may also be preset and held in the fourth storage unit 44 to let, for example, the user select the domain label.

As described above, upon establishment of the domain configuration information about the business domain subject to construction by input or selection of information by the user, the domain management unit 36 attempts an authorized connection with the intended business application package distribution site in the next step 206. It is to be noted that an attempt of authorized connection with the business application package distribution site is made by accessing an URL that is set in the site credential information, and when the credential information is requested, sending the credential information that is set in the site credential information.

In the next step 208, the domain management unit 36 determines whether the authorized connection with the intended business application package distribution site is successful. When the determination is negative, the domain management unit 36 proceeds to step 210 in which a message indicating that the authorized connection with the specified site is not possible is displayed on the display unit 62, and then ends the business domain construction process. In addition, when the determination in step 208 is positive, the domain management unit 36 proceeds to step 212. Then, the domain management unit 36 downloads and stores in the fourth storage unit 44 additional domain configuration information 46 and the conversion policy information 48, which includes a modification rule illustrated in FIG. 8A and a prohibition rule illustrated in FIG. 8B, and then ends the business domain construction process.

It is to be noted that the business domain constructed by the business domain construction process mentioned above is an example of a specific environment in the disclosed technique.

Next, with reference to FIGS. 6A and 6B, an example of the package management information 28 stored in the first storage unit 22 is described. Items in the package management information 28 are basically the same, although may be slightly different depending on the type of platform of the information processing terminal 10, and two representative types of information are illustrated in FIGS. 6A and 6B. FIGS. 6A and 6B illustrate the package management information 28 of three types of applications in similar manners. In the package management information 28 illustrated in FIG. 9A, the applications of the item numbers 1 and 3 have an identical group ID, representing that the applications for the item numbers 1 and 3 share resources. In addition, in the package management information 28 illustrated in FIG. 9B, the applications for the item numbers 1 and 3 have the same user ID, representing that the applications for the item numbers 1 and 3 share the resources. As just described, based on whether an identical group ID or user ID is set in the package management information 28, it is possible to distinguish whether individual applications share resources.

Figure 10:
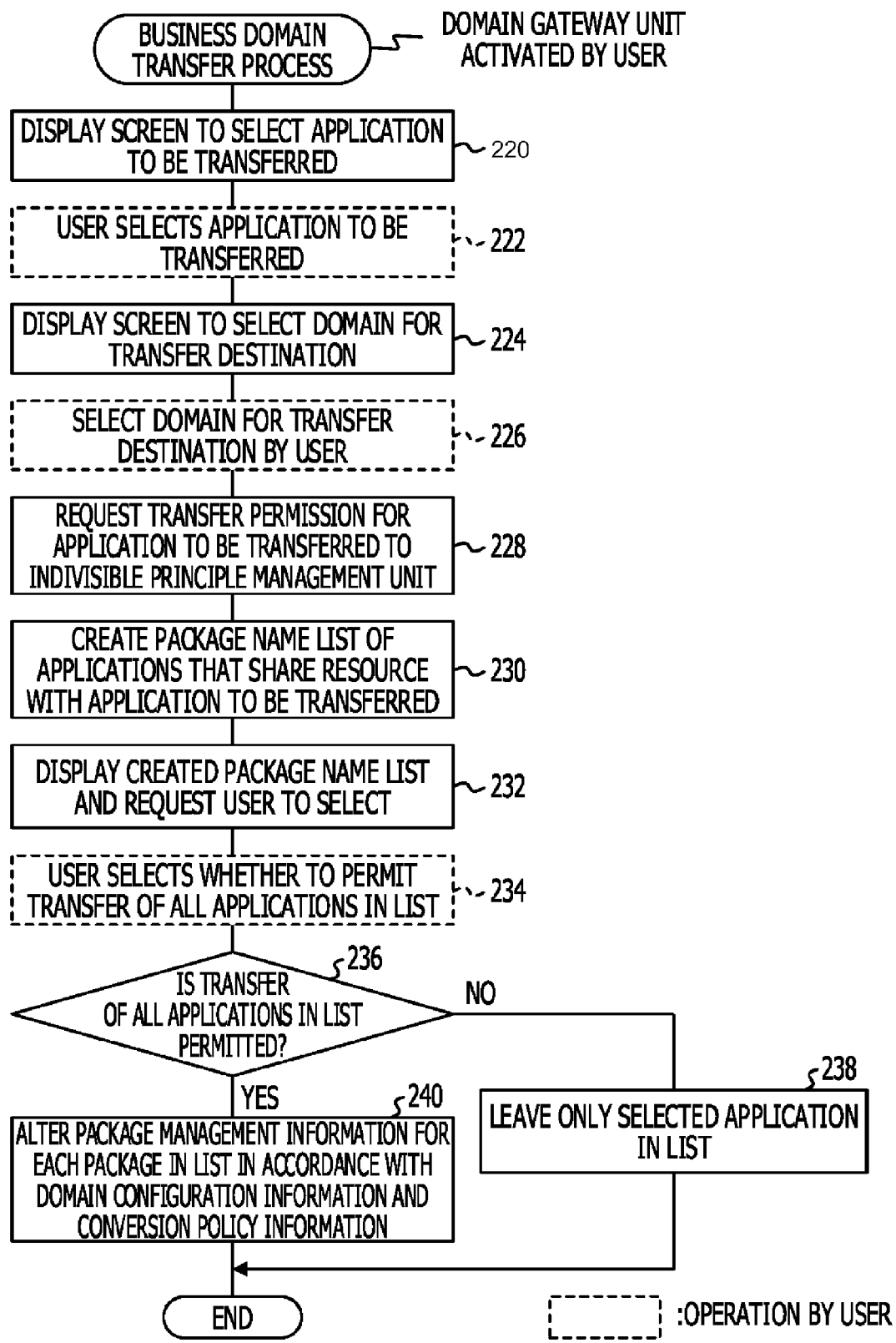
FIG. 10 is a flowchart illustrating an example of a business domain transfer process according to the first embodiment.

Next, with reference to FIG. 10, a business domain transfer process carried out when transfer of an application from a general domain to a business domain is specified by a user in the domain gateway unit 38 is described. In step 220 in FIG. 10, the domain gateway unit 38 activated by a user displays on the display unit 62 an application selection screen that displays a listing of applications subject to transfer. Upon the application selection screen being displayed on the display unit 62, the user of the information processing terminal 10 performs an operation to select, via the input unit 64, an application to be transferred (step 222 in FIG. 10).

When an application to be transferred is selected by a user, in the next step 224 the domain gateway unit 38 displays a domain selection screen that displays on the display unit 62 a list of domains for the transfer destination. When the domain selection screen is displayed on the display unit 62, the user of the information processing terminal 10 performs an operation to select a domain for transfer destination via the input unit 64 (step 226 in FIG. 10).

When the user selects the domain for the transfer destination, in the next step 228 the domain gateway unit 38 requests permission from the indivisible policy management unit 42 to transfer the selected application, which is to be transferred, to the selected domain for the transfer destination. In the next step 230, the indivisible policy management unit 42 references the package management information 28 stored in the first storage unit 22 and creates a list that lists package names of all applications that shares resources with the application transferred.

In the next step 232, the indivisible policy management unit 42 passes the created list to the domain gateway unit 38, and the domain gateway unit 38 causes the display unit 62 to display a listing of the package names displayed in the list passed from the indivisible policy management unit 42. In addition, the domain gateway unit 38 causes the display unit 62 to display a message requesting the selection of whether all applications of each package name displayed in the listing on the display unit 62 are to be transferred to the domain at the transfer destination.

The list displayed on the display unit 62 is a list for carrying out an operation in which a user selects whether all applications for each package name displayed in the listing are to be transferred to the domain of the transfer destination (also refer to step 234 in FIG. 10). When the user selects "deny permission to transfer" (NO), the domain gateway unit 38 makes only the application packages that are initially specified by the user, out of the application packages that are displayed in the list, subject to the transfer. When the user selects "permit transfer" (YES), the domain gateway unit 38 makes all application packages displayed in the list subject to the transfer.

In the next step 236, the domain gateway unit 38 determines whether transfer of all application packages displayed in the list is permitted. When the determination in step 236 is positive, the domain gateway unit 38 proceeds to step 240. In step 240, the domain gateway unit 38 rewrites permission control information for the system that includes the package management information 28 of the package management unit 12 (FIGS. 6A and 6B) and the like in accordance with the domain configuration information 46 and the conversion policy information 48 of the domain management unit 36.

The following description is a specific example of processing in step 240. information about the application packages of the item numbers 1 through 3 is registered in the package management information 28 illustrated in FIG. 9B. Here, when, for example, the user specifies transfer of the application package of the item number 1 to the business domain, the domain gateway unit 38 calls the indivisible policy management unit 42.

The indivisible policy management unit 42 searches the package management information 28 illustrated in FIG. 9B and determines whether the application of the item number 1 shares resources with another application. In the package management information 28 illustrated in FIG. 9B, since the same user ID (group ID) is assigned to the applications with the item numbers 1 and 3, it is possible to identify that the applications of the item numbers 1 and 3 share resources. Therefore, the indivisible policy management unit 42 creates a list in which application package names of the item numbers 1 and 3 are registered and passes the created list to the domain gateway unit 38.

The domain gateway unit 38, which is passed the list from the indivisible policy management unit 42, asks permission to the user whether to transfer the applications of the item numbers 1 and 3 to the business domain "dom1". When the user permits this, the domain gateway unit 38 rewrites the package management information 28 by making the information that is set as a domain namespace in "dom1" of the domain configuration information 46 in FIG. 7 to be a prefix of a folder name that contains the package management information 28. Accordingly, the package management information 28 is altered as illustrated in FIG. 11.

As a result of rewriting the package management information 28 by the domain gateway unit 38, the package management unit 12 generates the entry management information 50 illustrated in FIG. 12. With the entry management information 50 in FIG. 12, when an operation of transferring (returning) to the general domain is carried out by the user for a registered application (that is, entered in the business domain dom1), both applications are transferred to the general domain according to the indivisible policy. The rewriting at this time is made by rewriting (reverting) the package management information 28 having a prefix of the information that is set as an altering character string in the entry management information 50 in FIG. 12.

In contrast, when the determination in step 236 is negative, the domain gateway unit 38 proceeds to step 238 and leaves only the application packages that are initially specified by the user, out of the application packages displayed in the list, in the list so that the application packages are subject to the transfer.

The following description is a specific example of processing in step 238. Information about the application packages for the item numbers 1 through 3 are registered in the package management information 28 illustrated in FIG. 9B. When, for example, transfer of the application package of the item number 1 to the business domain is specified by the user, the domain gateway unit 38 calls the indivisible policy management unit 42.

The indivisible policy management unit 42 searches the package management information 28 illustrated in FIG. 9B and determines whether the application of the item number 1 shares resources with another application. In the package management information 28 illustrated in FIG. 9B, since the same user ID (group ID) is assigned to the applications for the item numbers 1 and 3, it is possible to recognize that the applications for the item numbers 1 and 3 share resources. Therefore, the indivisible policy management unit 42 creates a list in which application package names for the item numbers 1 and 3 are registered and passes the created list to the domain gateway unit 38.

The domain gateway unit 38, which is passed the list from the indivisible policy management unit 42, asks the user for permission as to whether to transfer the applications of the item numbers 1 and 3 to the business domain "dom1". When the user denies permission, the domain gateway unit 38 asks the user for permission as to whether to transfer only the application for the item number 1 to the business domain "dom1". When the user permits this, the domain gateway unit 38 makes the information that is set as a domain namespace in "dom1" of the domain configuration information 46 in FIG. 7 to be a prefix of a folder name that contains the package management information 28. Accordingly, the package management information 28 is altered as illustrated in FIG. 13.

As a result of alteration of the package management information 28 by the domain gateway unit 38, the package management unit 12 generates the entry management information 50 as illustrated in FIG. 14. In the entry management information 50 in FIG. 14, an independent user ID (uid-100) as illustrated in the current information is allocated to the applications registered therein (entered in the business domain dom1). With the application registered in the entry management information 50 in FIG. 14, when an operation of transferring (returning) to the general domain is carried out by the user, the domain gateway unit 38 transfers according to the indivisible policy. The rewriting at this point is made by rewriting (reverting) the package management information 28 having a prefix of the information that is set as altering rewriting character string in the entry management information 50 in FIG. 14, and further by rewriting (reverting) the user ID of the current information to the original information.

Next, with reference to FIGS. 12 and 13, rewriting of the permission management information in the system based on the domain configuration information 46 (FIG. 7) and the conversion rule (FIG. 8A) and the prohibition rule (FIG. 8B) of the conversion policy information 48 is described. Regarding an identical application, FIG. 15 is an example of the permission management information in the system before rewriting and FIG. 16 is after rewriting.

Figure 15:
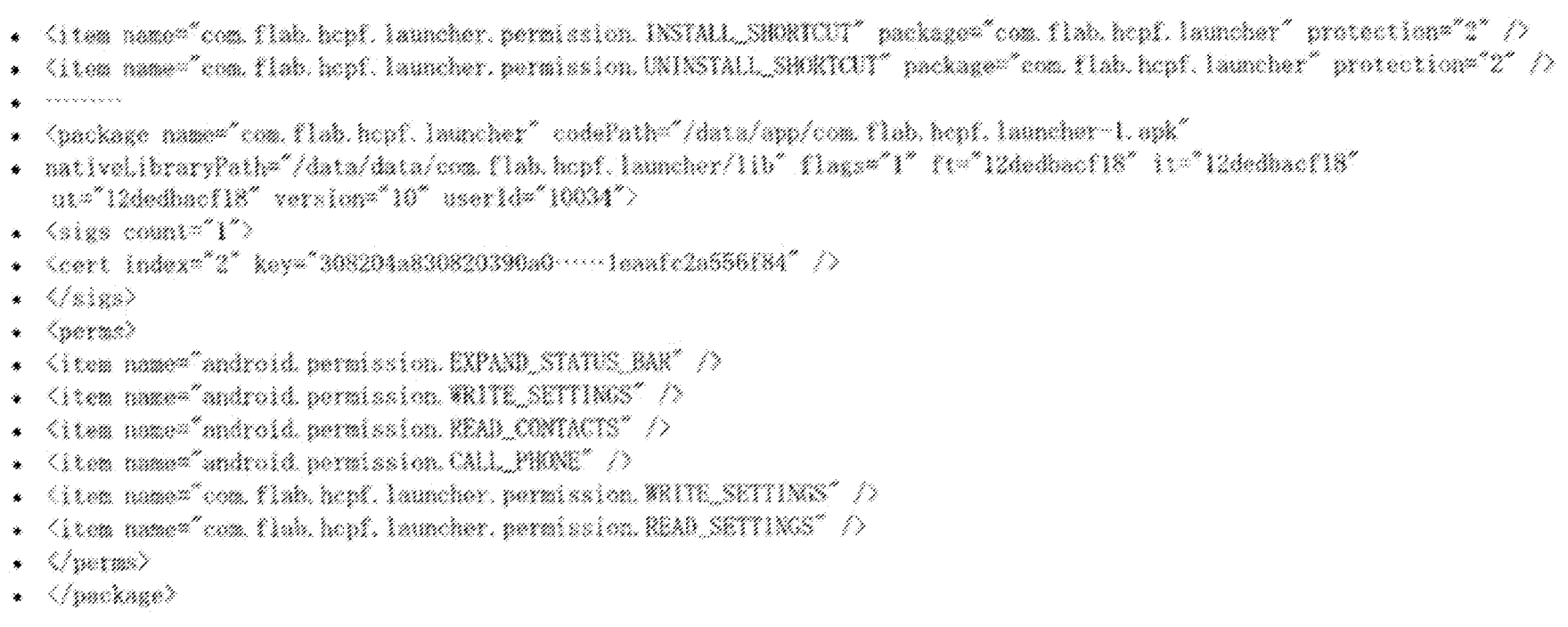

FIG. 15 is a specific example of the permission management information in the system for an application called launcher (com.flab.hcpf.launcher is a package name), and illustrates that the application is downloaded from a certain site and installed to be in the general domain. As illustrated in "dom3" in FIG. 7, an isolated domain is set and the domain namespace is isolate.domain.name. The user performs an operation with respect to the domain gateway unit 38 of transferring the launcher application to the isolated domain, and from the state of permitting the transfer, the procedure of alteration is described below.

The rewriting procedure firstly refers to FIG. 8A, which is an rewriting rule of the conversion policy information 48. FIG. 8A represents that the <item name> sandwiched by <permission> and </permission> is subject to alteration. It is also expressed in bold in FIG. 16 that codePath and nativeLibraryPath sandwiched by <package> and </package> and further <item name> sandwiched by <perms> and </perms> are similarly to be rewritten. Then, parts other than the preceding are not to be rewritten. The previously mentioned elements to be rewritten may be rewritten with the domain namespace of "dom3" as a prefix, which is expressed in italic in FIG. 16. However, as the prohibition rule (FIG. 8B) of the conversion policy information 48 is also referred to at the same time, even the previously mentioned elements rewritten (in bold) are not rewritten due to the prohibition rule. The functioning of the prohibition rule is illustrated by rows having a bold character string and not having an italic character string in FIG. 16.

Subsequently, with reference to FIG. 17, functions of the namespace resolution unit 40 of the application execution management unit 20 are described. The application execution management unit 20 provides a mechanism (intent) in which a certain application calls another application or a function of another application in cooperation with the package management unit 12. The intent is one of the functions of the platform used in the information processing terminal 10, and is a mechanism to join application software items or functions in software, which may be called a schema depending on the platform.

For example, when the user wants to perform an operation with respect to the data displayed on the display unit 62, the application notifies the system of the gist thereof. The system finds out an application or a function in an application that may carry out the operation with respect to the data and presents the application as an option to the user. The user may call, if there is any function intended to be executed among the presentation, the application to be executed.

Figure 17:
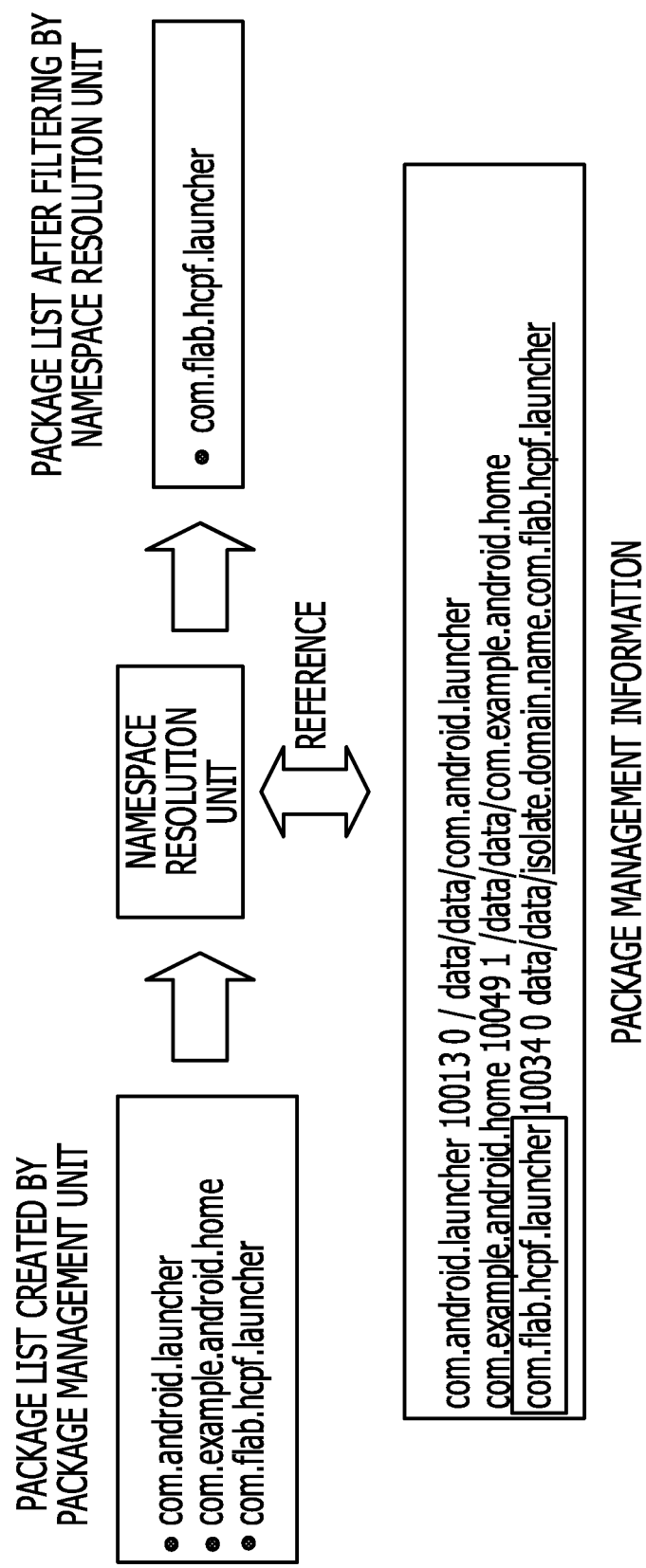
FIG. 17 is a diagram illustrating a mechanism in which a namespace resolution unit monitors namespace information.

A solution list illustrated in FIG. 17 that is created by the package management unit 12 represents a result of requesting a listing of functions that may be executed vaguely with respect to the data without clarifying what the relevant application is supposed to perform (for example, intent for information for action=android.intent.action.MAIN and category=android.intent.category.HOME). The solution list is the information presented by the system as options to the user in the above description. In the present embodiment, the namespace resolution unit 40 interrupts the process of presenting the options to the user.

The namespace resolution unit 40 monitors applications with reference to the entry management information 50 corresponding to the isolated domain. The namespace resolution unit 40 checks underlined information illustrated in the package management information 28 (information for "nativeLibraryPath" and "codePath" in FIG. 16) in the package names of the applications presented in a rectangular frame in FIG. 17. Then, the namespace resolution unit 40 determines whether the underlined information matches the prefix (isolate.domain.name) of the domain namespace in the domain configuration information about the isolated domain "dom3".

The namespace resolution unit 40, when the interruption ends, returns, to the system, information (a solution list after filtering as illustrated in FIG. 17) in which applications not matching the prefix are removed from the solution list (options) generated by the package management unit 12 of the system. Accordingly, the applications presented by the system to the user as options are, as represented in the solution list after filtering in FIG. 17, limited to the applications entered in the isolated domain.

Accordingly, the information processing terminal 10 according to the present embodiment may utilize an application downloaded by the user for closure in the business domain. In addition, while applications are able to be transferred to the business domain, for applications that are not directly related to business, a reduction in development costs as well as a reduction in the resources needed to adjust the non-related applications so that they are able to be used with the business domain are able to be achieved.

In addition, even when an application to be transferred to the business domain shares resources with another application, it is possible to take measures, such as to transfer both, not to transfer both, or to transfer one and not to share the resources with the other. Accordingly, it is possible to prevent information leakage derived from resource sharing (cryptochannel) with a general downloaded application that located outside the business domain, and thus it is possible to improve work security.

Second Embodiment

Next, a second embodiment of the disclosed technique will be described. It is to be noted that the same reference character is given to a portion the same as that in the first embodiment, and description thereof is omitted.

Figure 18:
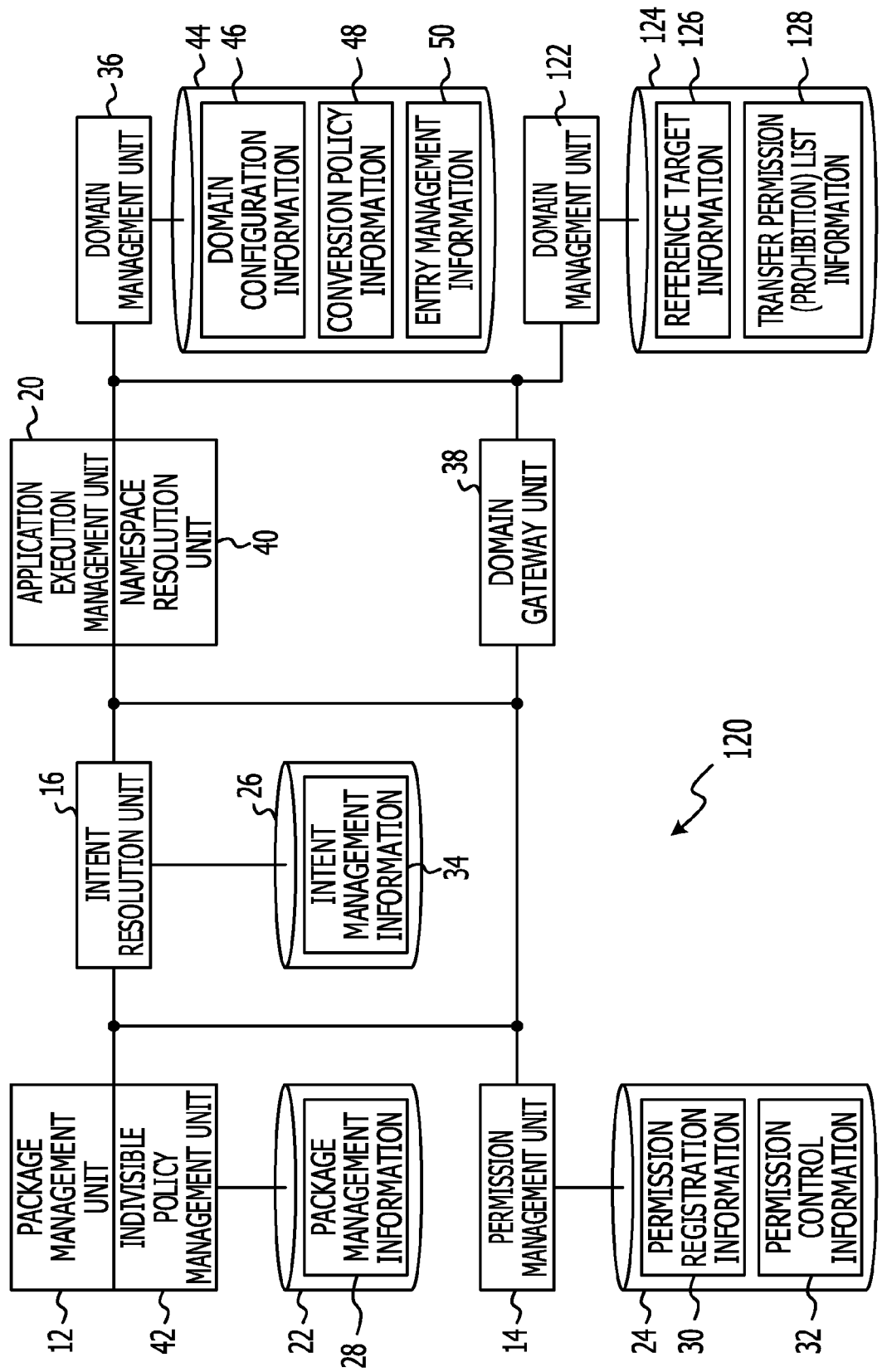
FIG. 18 is a functional block diagram of an information processing device according to a second embodiment.

FIG. 18 illustrates an information processing terminal 120 according to the present second embodiment. The information processing terminal 120 according to the second embodiment is different in that a reliability information reference unit 122 and a fifth storage unit 124 are equipped therein compared with the information processing terminal 10 described in the first embodiment.

The reliability information reference unit 122 obtains security information about reliable (permitted to be transferred to the business domain) applications and unreliable (not permitted to be transferred to the business domain) applications from an application introduction site or a security information transmission site.

Figure 21:
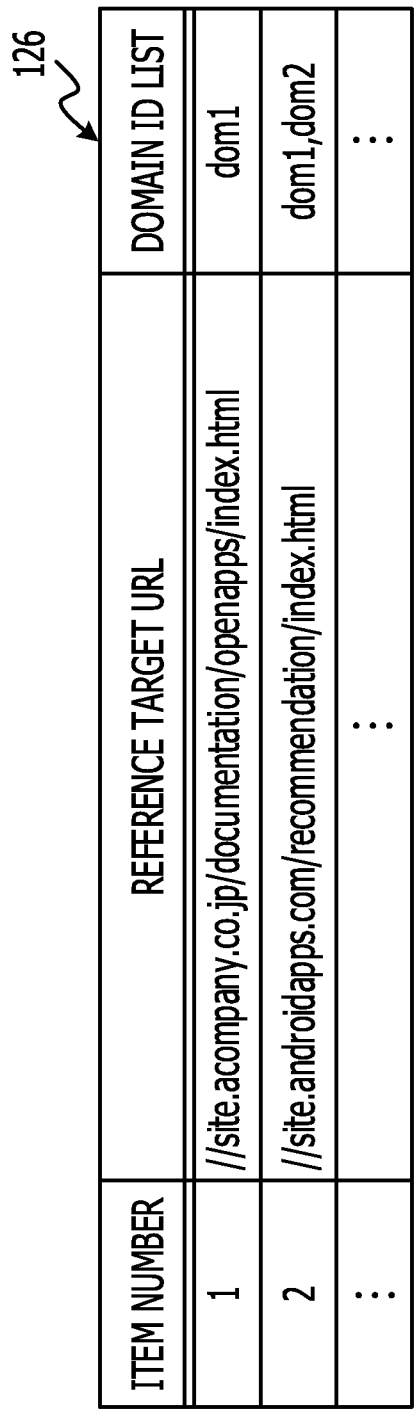
FIG. 21 is a table illustrating an example of reference target information.

Stored in the fifth storage unit 124 is reference target information 126 in which reference target URLs for the application introduction sites and the security information transmission sites to be accessed by the reliability information reference unit 122 are registered. FIG. 21 illustrates an example of the reference target information 126. In the reference target information 126, a domain to take measures is set for each reference site on the basis of the security information available from each site. For example, the measures are taken for the domain ID "dom1" based on the security information obtained from the site for the item number 1 in FIG. 21. Similarly, measures are taken for the domain IDs "dom1" and "dom2" based on the security information obtained from the site for the item number 2 in FIG. 21.

In addition, in the fifth storage unit 124, the security information about reliable applications and unreliable applications obtained by the reliability information reference unit 122 is stored as transfer permission (prohibition) list information 128. FIGS. 19A and 19B illustrate an example of the transfer permission (prohibition) list information 128. FIG. 22A is transfer permission list information 128A in which information about the reliable applications obtained by the reliability information reference unit 122 is generated as permission list information for transfer using package name information about the applications that manages each preset domain. FIG. 22B is transfer prohibition list information 128B in which information about unreliable applications obtained by the reliability information reference unit 122 is generated as prohibition list information for transfer using package name information about the applications that manages each preset domain. For example, FIG. 22A is permission list information applied when entry is made to the business domain "dom1", and FIG. 22B is prohibition list information applied when entry is made to the business domain "dom1".

Figure 19:
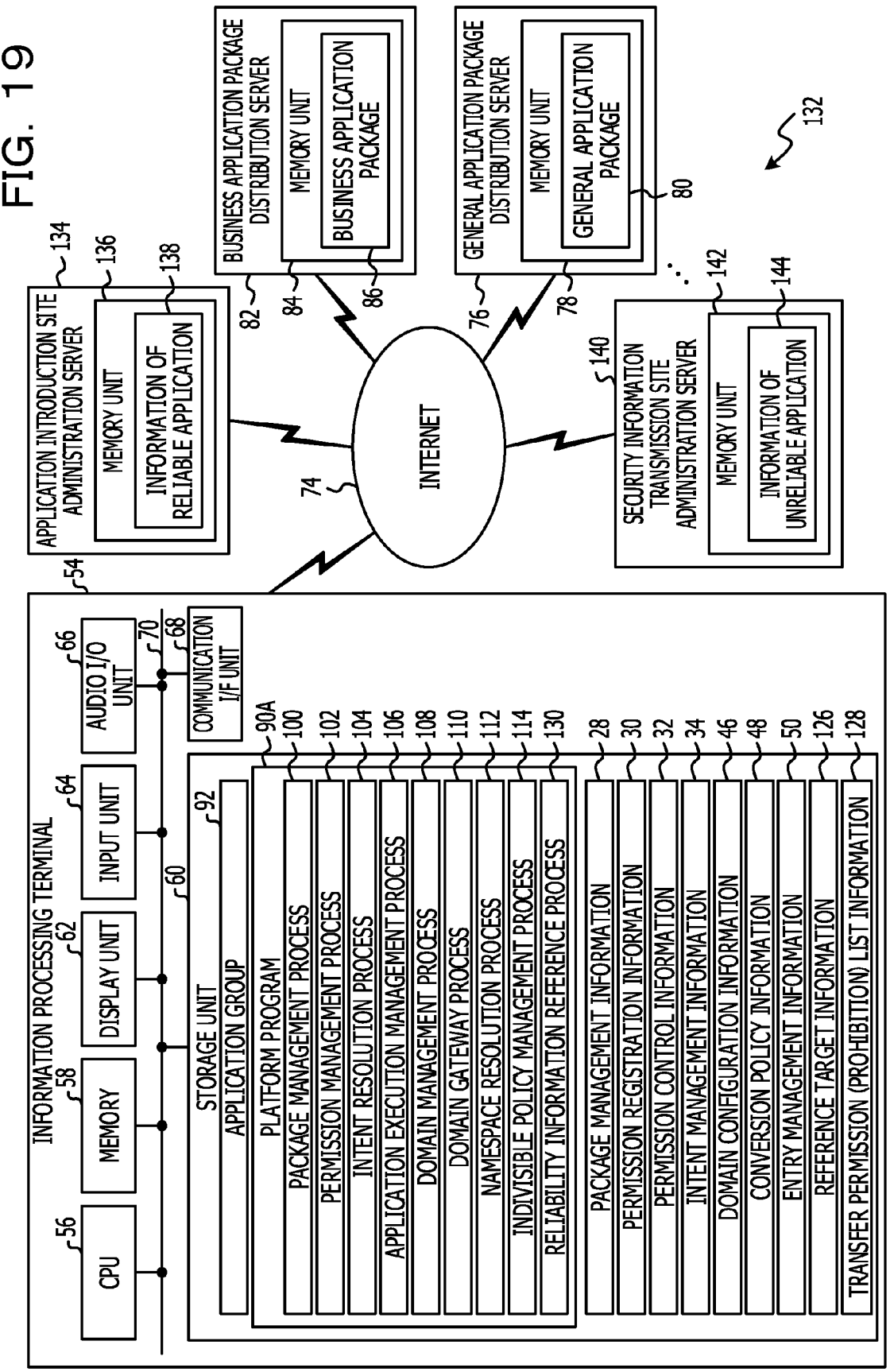
FIG. 19 is a block diagram of a computer that may function as the information processing device in FIG. 15 and the periphery thereof.

The information processing terminal 120 may be achieved by, for example, the computer 54 illustrated in FIG. 19. The computer 54 is included in a computer system 132 and connected to the internet 74 via the network I/F unit 58. The computer system 132 is provided with, in addition to the plurality of general application package distribution servers 76 and the business application package distribution server 82, an application introduction site administration server 134 and a security information transmission site administration server 140. Each of the general application package distribution servers 76, the business application package distribution server 82, the application introduction site administration server 134, and the security information transmission site administration server 140 is connected to the internet 74.

The application introduction site administration server 134 is provided with a storage unit 136, and in the storage unit 136, information 138 about reliable applications (for example, information regarding reputation of the applications) is stored in a form that allows downloading by the information processing terminal 120. The security information transmission site administration server 140 is provided with a storage unit 142, and in the storage unit 142, information 144 about unreliable applications (for example, information as about the reputation of an application) is stored in the form that allows download by the information processing terminal 120.

In contrast, stored in the storage unit 60 of the computer 54 are a platform program 90A and an application group 92 are stored, as well as the reference target information 126 and the transfer permission (prohibition) list information 128. Accordingly, the storage unit 60 also functions as an example of the fifth storage unit 124. The CPU 56 reads out the platform program 90A from the storage unit 60 to be expanded into the memory 58 and sequentially executes processes contained in the platform program 90A.

The platform program 90A has, in addition to the respective processes of the platform program 90 described in the first embodiment, a reliability information reference process 130. The CPU 56 executes the reliability information reference process 130, thereby behaving as the reliability information reference unit 122 illustrated in FIG. 18. Accordingly, the computer 54 that has executed the platform program 90A functions as the information processing terminal 120. It is to be noted that the platform program 90A is an example of the information processing program according to the disclosed technique.

Figure 20:
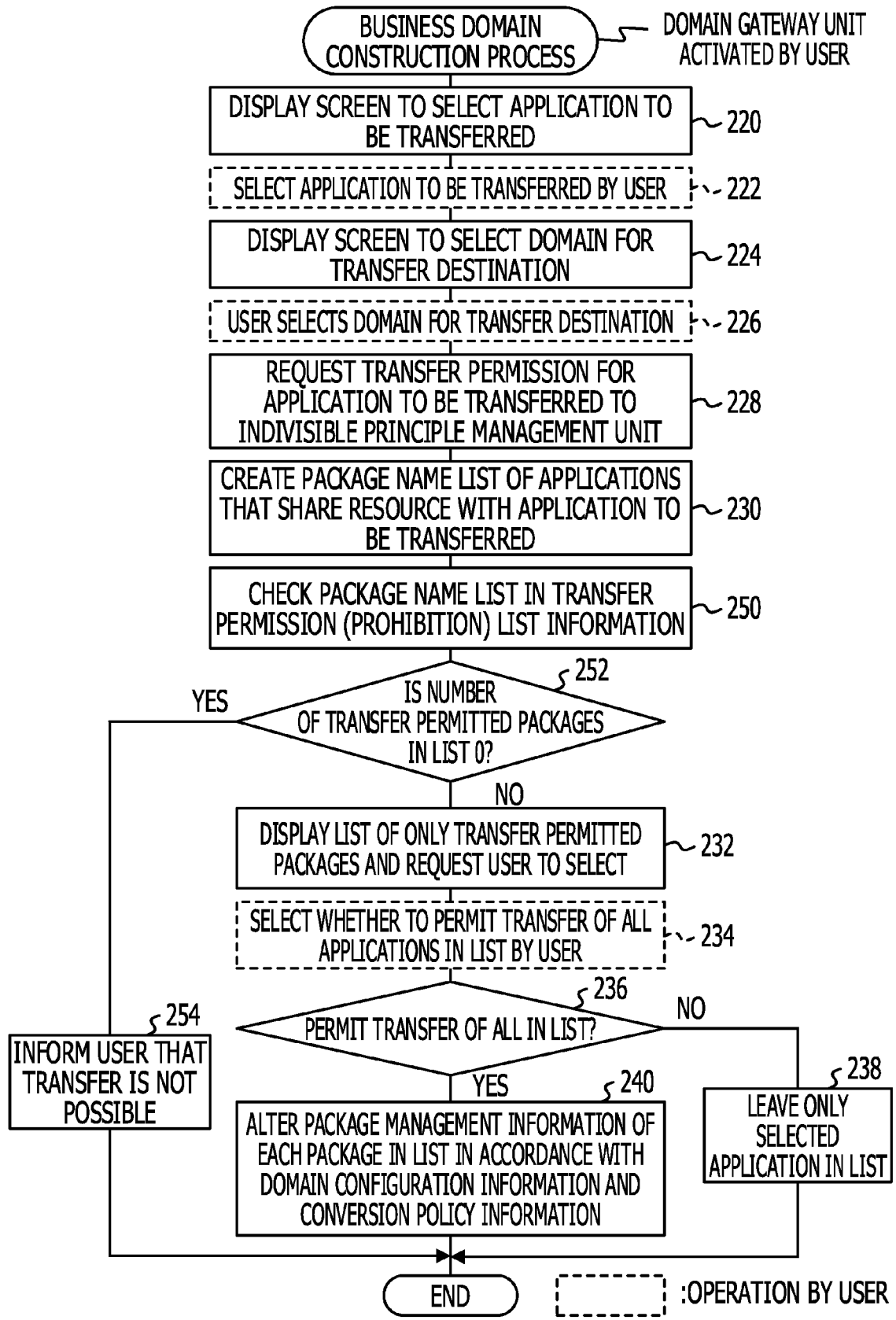
FIG. 20 is a flowchart illustrating an example of a business domain transfer process according to the second embodiment.

Next, with reference to FIG. 20, a business domain transfer process according to the present second embodiment is described. In step 220 in FIG. 20, the domain gateway unit 38 that is activated by a user displays an application selection screen that displays a list of applications to be transferred on the display unit 62. When the application selection screen is displayed on the display unit 62, the user of the information processing terminal 120 performs an operation via the input unit 64 of selecting an application to be transferred (step 222 in FIG. 20).

When the application to be transferred is selected by the user, the domain gateway unit 38 displays the domain selection screen that displays a listing of domains for transfer destinations on the display unit 62 in the next step 224. When the domain selection screen is displayed on the display unit 62, the user of the information processing terminal 120 performs an operation via the input unit 64 to select a domain for a transfer destination (step 226 in FIG. 20).

As the domain at the transfer destination is selected by the user, the domain gateway unit 38 requests permission to transfer the selected application to be transferred to the selected domain at the transfer destination to the indivisible policy management unit 42 in the next step 228. In the next step 230, the indivisible policy management unit 42 refers to the package management information 28 that is stored in the first storage unit 22 and creates a package name list that displays a listing of package names for all applications that share resources with the application to be transferred.

In the next step 250, the domain gateway unit 38 checks the package name list that is created by the indivisible policy management unit 42 in the transfer permission (prohibition) list information 128 associated with the business domain, which is where the application is to be transferred to. Then, among the applications in the package name list, the applications described in the transfer permission list information 128A are left in the package name list and the applications written in the transfer prohibition list information 128B are removed from the package name list.

In the next step 252, the domain gateway unit 38 determines whether the number of application packages remaining in the package name list (application packages permitted to transfer to the business domain) after the check in step 250 is 0. When the determination in step 252 is positive, it is possible to understand that the application packages described in the package name list that is initially created by the indivisible policy management unit 42 are unreliable (not permitted to be transferred to the business domain) packages. Therefore, going on to step 254, the domain gateway unit 38 informs the user that the application package may not be transferred to the business domain and then terminates the business domain transfer process.

It is to be noted that the process when the determination in step 252 is negative (when the number of application packages remaining in the package name list through the check in step 250 is 1 or more) is the same as the process in the first embodiment, and the description thereof is omitted.

Accordingly, the present second embodiment may prevent a user from mistakenly transferring an unreliable application, such as spoof malware, to the business domain, and may further improve business security.

It is to be noted that, although FIGS. 12 and 13 illustrate lists with the premise of an Android platform, the disclosed technique is also applicable to an arbitrary platform other than Android as long as the platform has a sandbox or a mechanism that is similar to a sandbox.

In addition, although the business domain is described above as an example of the specific environment in the disclosed technique, the specific environment may also be other than a business domain and the disclosed technique is also applicable to modes in which no business domain is constructed.

Still in addition, although the mode is described above that the platform program 90 or 90A, which is an example of the information processing program according to the disclosed technique, is stored (installed) in the storage unit 60 in advance, the information processing program is not limited to the mode. The information processing program according to the disclosed technique may also be provided in the form of being recorded in a recording medium, such as a CD-ROM, a DVD-ROM, and a flash memory. Further, it may also be provided by updating terminal software using a network, as part of terminal maintenance, in the form of connecting to a PC having the maintenance software therein or in the form of connecting directly to a service site for maintenance.

All documents, patent applications, and technical standards mentioned in the present specification are incorporated herein by reference to the same extent when the incorporation of individual document, patent application, and technical standard by reference is specifically and individually mentioned.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
permit a first computer program and a second computer program to access a resource when first identification information of the first computer program is identical to second identification information of the second computer program, the resource being information used upon executing the first computer program and the second computer program,
receive an instruction to transfer the first computer program from a first execution environment for non-business purposes to a second execution environment for business purposes, the first computer program being configured to access the resource,
detect, by checking the first identification information and the second identification information, the second computer program located in the first execution environment that is configured to access the resource,
provide information for a user to determine whether to transfer the second computer program from the first execution environment to the second execution environment,
transfer the first computer program to the second execution environment and prohibit the first computer program to access the resource by changing the first identification information to a third identification information different from the second identification information when receiving a first instruction not to transfer the second computer program to the second execution environment, and
transfer the first computer program and the second computer program to the second execution environment when receiving a second instruction to transfer the second computer program to the second execution environment.

2. The information processing apparatus according to claim 1, wherein the processor is configured to:
display a list including information for identifying the second computer program; and determine whether to transfer the second computer program to the second execution environment based on whether the information for identifying the second computer program is selected.

3. The information processing apparatus according to claim 1, wherein
the first computer program is stored in a folder, and
the processor is configured to:
change the name of the folder to include first information indicating the second execution environment, and
block calling the first computer program transferred to the second execution environment from a third computer program located in the first execution environment when second information for identifying the third computer program does not include the first information indicating the second execution environment.

4. The information processing apparatus according to claim 3, wherein the processor is configured to:
permit calling the first computer program transferred to the second execution environment from the third computer program when the second information for identifying the third computer program includes the first information indicating the second execution environment.

5. The information processing apparatus according to claim 1, wherein the processor is configured to:
collect evaluation information for evaluating whether each of the first computer program or the second computer program is reliable; and
permit transferring each of the first computer program or the second computer program to the second execution environment when each of the first computer program or the second computer program is determined to be reliable based on the collected evaluation information.

6. A method of controlling an information processing apparatus, the method comprising:
permitting a first computer program and a second computer program to access a resource when first identification information of the first computer program is identical to second identification information of the second computer program, the resource being information used upon executing the first computer program and the second computer program;
receiving an instruction to transfer the first computer program from a first execution environment for non-business purposes to a second execution environment for business purposes, the first computer program being configured to access the resource;
detecting, by checking the first identification information and the second identification information, the second computer program located in the first execution environment that is configured to access the resource;
providing information for a user to determine whether to transfer the second computer program from the first execution environment to the second execution environment,
transferring the first computer program to the second execution environment and prohibiting the first computer program to access the resource by changing the first identification information to a third identification information different from the second identification information when receiving a first instruction not to transfer the second computer program to the second execution environment, and
transferring the first computer program and the second computer program to the second execution environment when receiving a second instruction to transfer the second computer program to the second execution environment.

7. The method according to claim 6, the method further comprising:
displaying a list including information for identifying the second computer program; and
determining whether to transfer the second computer program to the second execution environment based on whether the information for identifying the second computer program is selected.

8. The method according to claim 6, the method further comprising:
storing the first computer program in a folder,
changing the name of the folder to include first information indicating the second execution environment, and
blocking calling the first computer program transferred to the second execution environment from a third computer program located in the first execution environment when second information for identifying the third computer program does not include the first information indicating the second execution environment.

9. The method according to claim 8, the method further comprising:
permitting calling the first computer program transferred to the second execution environment from the third computer program when the second information for identifying the third computer program includes the first information indicating the second execution environment.

10. The method according to claim 6, the method further comprising:
collecting evaluation information for evaluating whether each of the first computer program or the second computer program is reliable; and
permitting transferring each of the first computer program or the second computer program to the second execution environment when each of the first computer program or the second computer program is determined to be reliable based on the collected evaluation information.

11. A non-transitory medium for storing a program that causes a processor to execute a process comprising:
permitting a first computer program and a second computer program to access a resource when first identification information of the first computer program is identical to second identification information of the second computer program, the resource being information used upon executing the first computer program and the second computer program;
receiving an instruction to transfer the first computer program from a first execution environment for non-business purposes to a second execution environment for business purposes, the first computer program being configured to access the resource;
detecting, by checking the first identification information and the second identification information, the second computer program located in the first execution environment that is configured to access the resource;
providing information for a user to determine whether to transfer the second computer program from the first execution environment to the second execution environment;
transferring the first computer program to the second execution environment and prohibiting the first computer program to access the resource by changing the first identification information to a third identification information different from the second identification information when receiving a first instruction not to transfer the second computer program to the second execution environment, and transferring the first computer program and the second computer program to the second execution environment when receiving a second instruction to transfer the second computer program to the second execution environment.

12. The non-transitory medium according to claim 11, the process further comprising:
    displaying a list including information for identifying the second computer program; and
    determining whether to transfer the second computer program to the second execution environment based on whether the information for identifying the second computer program is selected.

13. The non-transitory medium according to claim 11, the process further comprising:
    storing the first computer program in a folder,
    changing the name of the folder to include first information indicating the second execution environment, and
    blocking calling the first computer program transferred to the second execution environment from a third computer program located in the first execution environment when second information for identifying the third computer program does not include the first information indicating the second execution environment.

14. The non-transitory medium according to claim 13, the process further comprising:
    permitting calling the first computer program transferred to the second execution environment from the third computer program when the second information for identifying the third computer program includes the first information indicating the second execution environment.

15. The non-transitory medium according to claim 11, the process further comprising
    collecting evaluation information for evaluating whether each of the first computer program or the second computer program is reliable; and
    permitting transferring each of the first computer program or the second computer program to the second execution environment when each of the first computer program or the second computer program is determined to be reliable based on the collected evaluation information.

* * * * *